US008675640B2

(12) United States Patent
Liu et al.

(10) Patent No.: US 8,675,640 B2
(45) Date of Patent: Mar. 18, 2014

(54) METHOD, APPARATUS, AND SYSTEM FOR CONNECTING TO CALLED TERMINAL

(75) Inventors: Haiyang Liu, Shenzhen (CN); Xiaojin Li, Shenzhen (CN); Biao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 13/532,018

(22) Filed: Jun. 25, 2012

(65) Prior Publication Data

US 2012/0263034 A1    Oct. 18, 2012

Related U.S. Application Data

(63) Continuation of application No. PCT/CN2011/070997, filed on Feb. 15, 2011.

(30) Foreign Application Priority Data

Feb. 26, 2010    (CN) .......................... 2010 1 0116751

(51) Int. Cl.
*H04L 12/66* (2006.01)

(52) U.S. Cl.
USPC ........................................................ 370/352

(58) Field of Classification Search
USPC ............... 370/352, 338, 392; 455/456.1, 466, 455/560, 414.1, 445
See application file for complete search history.

(56) References Cited

U.S. PATENT DOCUMENTS

| 5,854,982 | A  | * | 12/1998 | Chambers et al. | ............ 455/445 |
| 7,843,860 | B2 | * | 11/2010 | Boman | ......................... 370/310 |
| 8,331,355 | B2 | * | 12/2012 | Buckley et al. | ................ 370/352 |
| 2010/0272096 | A1 |  | 10/2010 | Witzel et al. |  |
| 2011/0243126 | A1 |  | 10/2011 | Witzel et al. |  |

FOREIGN PATENT DOCUMENTS

| CN | 101047959 A | 10/2007 |
| CN | 101150781 A | 3/2008 |
| CN | 101159921 A | 4/2008 |
| CN | 101179815 A | 5/2008 |
| CN | 101217694 A | 7/2008 |

(Continued)

OTHER PUBLICATIONS

Partial translation of Office Action dated Jan. 5, 2013 in connection with Chinese Patent Application No. 201010116751.1.
English language International Search Report from the State Intellectual Property Office of P.R. China for Internatioanal Application No. PCT/CN2011/070997 mailed May 26, 2011.

(Continued)

*Primary Examiner* — Chandrahas Patel

(57) ABSTRACT

A method for connecting to a called terminal includes: acquiring mobile station international integrated service digital network number (MSISDN) information corresponding to a called terminal which is located at an IP multimedia subsystem (IMS) domain, together with international mobile subscriber identity (IMSI) information and location area identity (LAI) information that correspond to the MSISDN information when a primary mobile access gateway control function entity mAGCF has a failure; and performing a connecting to the called terminal through a selected mAGCF according to the MSISDN information, the IMSI information and the LAI information.

7 Claims, 9 Drawing Sheets

FIG. 1

(56) References Cited

FOREIGN PATENT DOCUMENTS

| CN | 101322373 A1 | 12/2008 |
| CN | 101790247 A | 7/2010 |
| DE | 10 2006 016 518 A1 | 10/2007 |
| EP | 1 928 192 A1 | 6/2008 |
| WO | WO 2007/045264 A1 | 4/2007 |
| WO | WO 2007/112644 A1 | 10/2007 |
| WO | WO 2009/049515 A1 | 4/2009 |
| WO | WO 2009/082927 A1 | 7/2009 |

OTHER PUBLICATIONS

Written Opinion of the International Searching Authority dated May 26, 2011 in connection with International Patent Application No. PCT/CN2011/070997.

Supplementary European Search Report Nov. 20, 2012 in connection with European Patent Application No. EP 11 784 6828.

Translation of Rejection Decision dated May 6, 2013 in connection with Chinese Patent Application No. 201010116751.1.

* cited by examiner

METHOD, APPARATUS, AND SYSTEM FOR CONNECTING TO CALLED TERMINAL

CROSS-REFERENCE TO RELATED APPLICATIONS

This application is a continuation of International Application No. PCT/CN2011/070997, filed on Feb. 15, 2011, which claims priority to Chinese Patent Application No. 201010116751.1, filed on Feb. 26, 2010, both of which are hereby incorporated by reference in their entireties.

FIELD OF THE INVENTION

The present invention relates to the field of communications technologies, and in particular, to a method, an apparatus, and a system for connecting to a called terminal.

BACKGROUND OF THE INVENTION

With the continuing evolution and development of communications technologies, the IP multimedia subsystem (IP Multimedia Subsystem; hereinafter referred to as IMS) network has gradually developed into a core network architecture of the $3^{rd}$ generation partnership project ($3^{rd}$ Generation Partnership Project; hereinafter referred to as 3GPP), and coexists with a circuit switching (Circuit Switching; hereinafter referred to as CS) network in a long term, so as to provide an IP multimedia service for a fixed and mobile subscribers that gets access with packets. The emergence of the IMS centralized services (IMS Centralized Service; hereinafter referred to as ICS) enables various services to be consistently controlled by an IMS network, so as to implement seamless and efficient interworking among various access ways.

In an ICS architecture, a mobile switching center (Mobile Switching Center; hereinafter referred to as MSC) evolves into a mobile access gateway control function (mobile Access Gateway Control Function; hereinafter referred to as mAGCF); and a supported protocol is converted from the 3GPP 24.008 protocol to the session initiation protocol (Session Initiation Protocol; hereinafter referred to as SIP). Accordingly, an MSC POOL (POOL) may evolve into a mAGCF POOL. The current 3GPP protocol does not definite a processing procedure of a mAGCF POOL, so a disaster recovery processing procedure of the mAGCF POOL under the ICS architecture in the prior art uses the one that is similar to a disaster recovery processing procedure of the MSC POOL. During an existing disaster recovery processing procedure in a mAGCF POOL, when a subscriber terminal is located at an IMS domain as a called party, and a primary mAGCF has a failure, an application server (Application Server; hereinafter referred to as AS) is required to send an SRI (MAP_SEND_ROUTING_INFORMATION) message which carries a mobile station international integrated service digital network (Integrated Service Digital Network; hereinafter referred to as ISDN) number (Mobile Station International ISDN Number; hereinafter referred to as MSISDN) to a home location register (Home Location Register; hereinafter, HLR). Then the HLR sends a PRN (PRN MAP_PROVIDE_ROAMING_NUMBER) message to the mAGCF, so as to acquire a mobile station roaming number (Mobile Station Roaming Number; hereinafter, MSRN) that is allocated to the mAGCF, and to trigger a connecting to a called terminal through the MSRN when the mAGCF has a failure.

During a disaster processing procedure in a mAGCF POOL, whether a called terminal is located at a CS domain or at an IMS domain, an AS may unconditionally acquire an MSRN from the CS domain, and the mAGCF is required to provide an MSRN for a subscriber in the IMS domain, and as a result, the performance of both the AS and the mAGCF is degraded; meanwhile, routing data of the MSRN is required to be configured, and as a result, a large number of routing resources are wasted.

SUMMARY OF THE INVENTION

Embodiments of the present invention provide a method, an apparatus, and a system for connecting to a called terminal, so as to solve the shortages in the prior art such as that during an disaster recovery processing procedure in a mAGCF POOL, whether the called terminal is located at a CS domain or at an IMS domain, an AS may unconditionally acquire an MSRN from the CS domain, and as a result, the network element performance is lowered; and to implement that during the disaster recovery procedure in a mAGCF POOL, when the called terminal is located at the IMS domain, an MSISDN may be directly used to perform a connecting to the called terminal. And therefore, subscribers in the IMS domain are not necessarily to be provided with MSRNs; the performances of the AS and the mAGCF are improved; and the routing resource waste is reduced.

An embodiment of the present invention provides a method for connecting to a called terminal, which includes:

when a primary mobile access gateway control function entity mAGCF has a failure, acquiring mobile station international integrated service digital network number MSISDN information corresponding to a called terminal which is located at an IP multimedia subsystem IMS domain, together with international mobile subscriber identity IMSI information and location area identity LAI information that correspond to the MSISDN information; and performing a connecting to the called terminal through a selected mAGCF according to the MSISDN information, the IMSI information and the LAI information.

An embodiment of the present invention provides an apparatus for connecting to a called terminal, which includes:

a first acquiring module, configured to, when a primary mobile access gateway control function entity mAGCF has a failure, acquire mobile station international integrated service digital network number MSISDN information corresponding to a called terminal which is located at an IP multimedia subsystem IMS domain, together with international mobile subscriber identity IMSI information and location area identity LAI information that correspond to the MSISDN information; and a connection processing module, configured to send, to a selected mAGCF, the MSISDN information, the IMSI information and the LAI information, where the selected mAGCF performs a connecting to the called terminal.

An embodiment of the present invention provides a system for connecting to a called terminal, which is applicable to a mAGCF POOL and includes an apparatus for connecting to a called terminal, where the apparatus for connecting to a called terminal is configured to:

when a primary mobile access gateway control function entity mAGCF has a failure, acquire mobile station international integrated service digital network number MSISDN information corresponding to a called terminal which is located at an IP multimedia subsystem IMS domain, together with international mobile subscriber identity IMSI information and location area identity LAI information that correspond to the MSISDN information; and send, to a selected mAGCF, the MSISDN information, the IMSI information and the LAI information, where the selected mAGCF performs a connecting to the called terminal.

With the method, the apparatus, and the system for connecting to a called terminal of the embodiments of the present invention, in an application scenario where a terminal is located at an IMS domain as a called terminal, when a primary mAGCF of the called terminal has a failure, MSISDN information, IMSI information and LAI information that correspond to the called terminal are acquired, and a connecting to the called terminal is performed through a selected mAGCF in a mAGCF POOL, so that a restoration of the called terminal of disaster recovery in the mAGCF POOL is implemented, and the shortages such as that during a disaster recovery processing procedure of a mAGCF POOL, whether the called terminal is located at a CS domain or at an IMS domain, an AS may unconditionally acquire an MSRN from the CS domain so that the performance of a network element is lowered are solved, so as to implement that during a disaster recovery procedure in the mAGCF POOL, an MSISDN is directly used to perform a connecting to the called terminal when the called terminal is located at the IMS domain. And therefore, subscribers in the IMS domain are not necessarily to be provided with MSRNs; the performances of the AS and the mAGCF are improved; and the routing resource waste is reduced.

BRIEF DESCRIPTION OF THE DRAWINGS

In order to illustrate the technical solutions in the embodiments of the present invention or in the prior art more clearly, the accompany drawings for describing the embodiments and the prior art are introduced briefly in the following. Apparently, the accompanying drawings in the following description are merely some embodiments of the present invention, and persons of ordinary skills in the art may further obtain other accompanying drawings according to these accompanying drawings without creative efforts.

DETAILED DESCRIPTION OF THE EMBODIMENTS

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
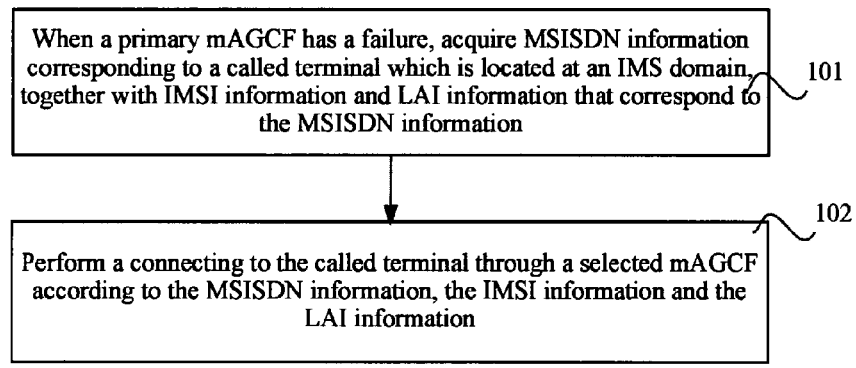
FIG. 1 is a flow chart of a first embodiment of a method for connecting to a called terminal according to the present invention.

FIG. 1 is a flow chart of a first embodiment of a method for connecting to a called terminal according to the present invention. As shown in FIG. 1, this embodiment provides a method for connecting to a called terminal, which includes the following steps.

Step 101: When a primary mobile access gateway control function entity mAGCF has a failure, acquire mobile station international integrated service digital network number MSISDN information corresponding to a called terminal which is located at an IP multimedia subsystem IMS domain, together with international mobile subscriber identity IMSI information and location area identity LAI information that correspond to the MSISDN information.

Figure 2:
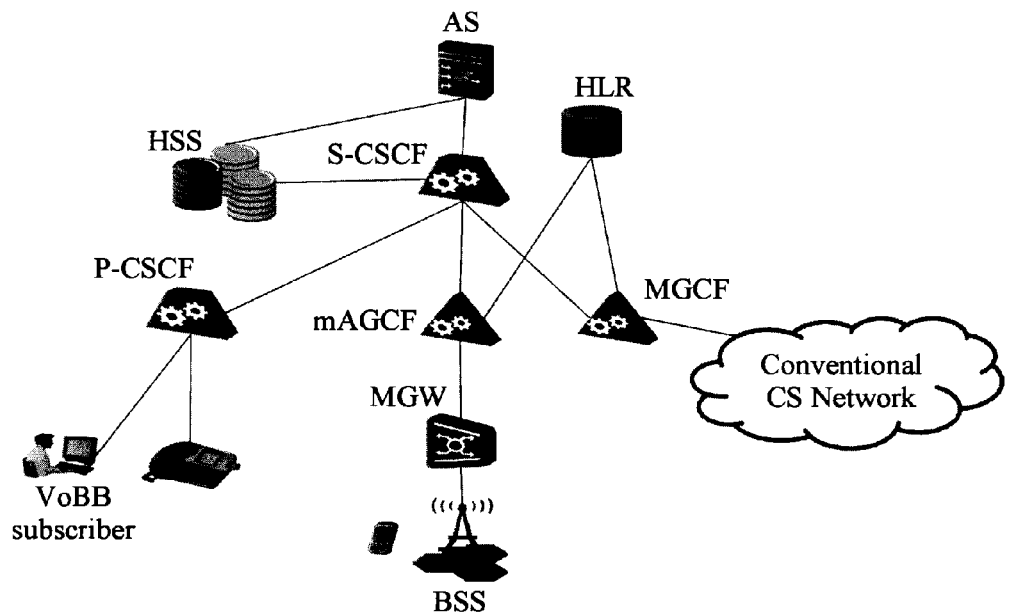
FIG. 2 is a schematic diagram of an ICS architecture of a first embodiment of a method for connecting to a called terminal according to the present invention.

FIG. 2 is a schematic diagram of an ICS architecture for a method for connecting to a called terminal according one embodiment of the present invention. This embodiment is a method for connecting to a called terminal provided in a scenario of integrating a CS network and an IMS network. In the ICS architecture, by evolving an original MSC server into a mAGCF and converting a supported protocol from the 3GPP 24.008 protocol to the SIP protocol, all conventional subscribers in the CS network are enabled to get access to the IMS network, and, in many access ways, may enjoy the same services provided by an AS. The AS is configured to provide a voice integrated service logic. A home subscriber server (Home Subscriber Server; hereinafter referred to as HSS) and an HLR respectively store subscriber data of a subscriber home IMS domain and of a CS domain. A serve-call session control function (Serve-Call Session Control Function; hereinafter referred to as S-CSCF) entity completes a triggering and a call control of an IMS/CS voice integrated service in the IMS domain and in the CS domain. A media gateway control function (Media Gateway Control Function; hereinafter referred to as MGCF) entity implements interworking between the IMS domain and the CS domain. A media gateway (Media Gateway; hereinafter referred to as MGW) provides a call control and a signaling function. FIG. 2 merely shows a mAGCF and a base station subsystem (Base Station Subsystem; hereinafter referred to as BSS). The specific application scenario of this embodiment is mAGCF POOL networking. One mAGCF POOL includes multiple mAGCFs; and one BSS may be connected to multiple mAGCFs in the mAGCF POOL. The mAGCF POOL is used to implement a network load sharing among the mAGCFs, so as to implement a disaster recovery backup at a mAGCF level, and to reduce inter-mAGCF location update and inter-mAGCF handover.

This embodiment may be applied in a scenario where a terminal is located at an IMS domain and is used as a called terminal. When a terminal is located at a CS domain, an MSC POOL disaster recovery processing procedure in the prior art may be used. When a terminal is used as a calling terminal, the MSC POOL disaster recovery processing procedure in the prior art may also be used. Even if a certain mAGCF has a failure, since the terminal used as a calling does not need international mobile subscriber identity (International Mobile Subscriber Identity; hereinafter referred to as IMSI) information, and location area identity (Location Area Identity; hereinafter referred to as LAI) information, the terminal registered on the mAGCF may be directly routed to other effective mAGCFs by using a load sharing algorithm.

Step 102: Perform a connecting to the called terminal through a selected mAGCF according to the MSISDN information, the IMSI information and the LAI information.

This embodiment provides a method for connecting to a called terminal. In an application scenario where a terminal is located at an IMS domain as a called terminal, when a primary mAGCF of the called terminal has a failure, MSISDN information, IMSI information and LAI information that correspond to the called terminal are acquired, and a connecting to the called terminal is performed through a selected mAGCF in a mAGCF POOL, so that a restoration of the called terminal of disaster recovery in the mAGCF POOL is implemented, and the shortages such as that during a disaster recovery processing procedure of a mAGCF POOL in the prior art, whether a called terminal is located at a CS domain or at an IMS domain, an AS may unconditionally acquire an MSRN from the CS domain so that the performance of a network element is lowered are solved, so as to implement that during a disaster recovery procedure in a mAGCF POOL, an MSISDN is directly used to perform a connecting to the called terminal when the called terminal is located at the IMS domain. And therefore, subscribers in the IMS domain are not necessarily to be provided with MSRNs; the performance of the AS and the mAGCF is improved; and the routing resource waste is reduced.

Figure 3:
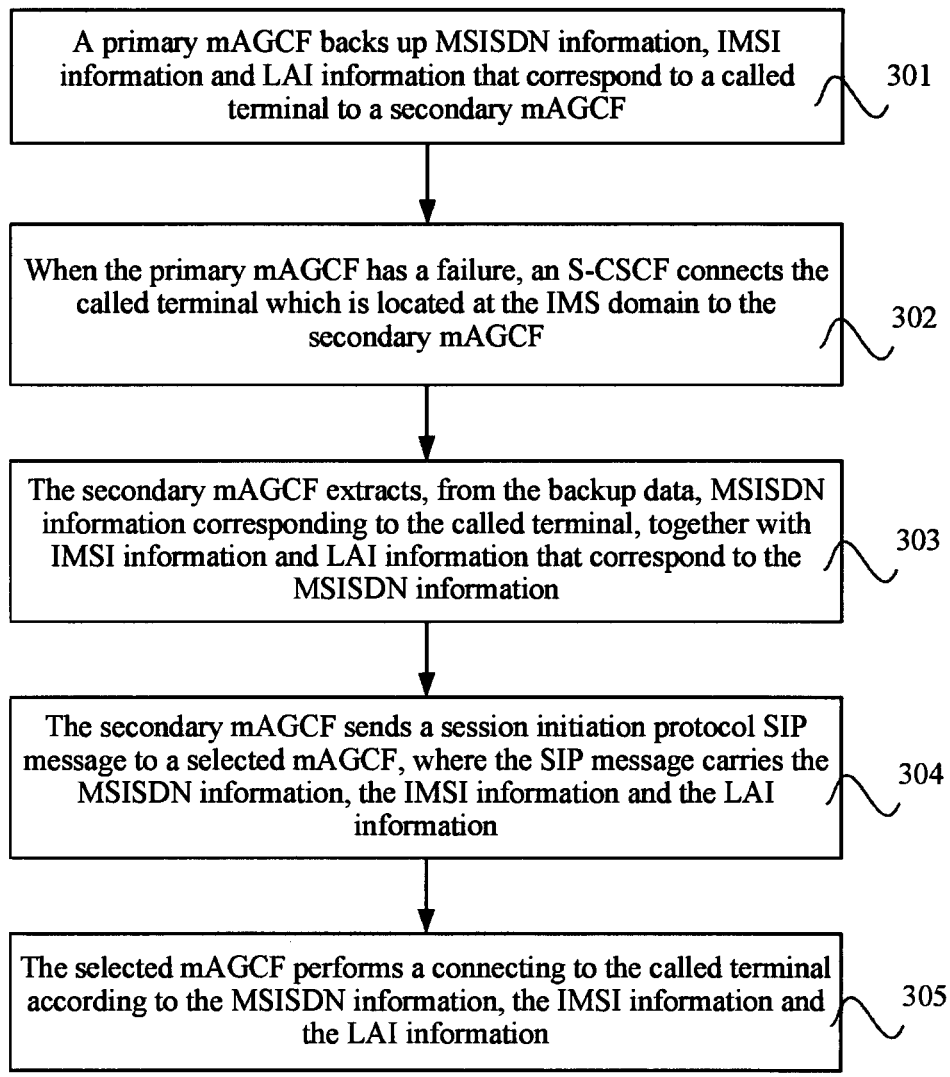
FIG. 3 is a flow chart of a second embodiment of a method for connecting to a called terminal according to the present invention.

FIG. 3 is a flow chart of a second embodiment of a method for connecting to a called terminal of the present invention. As shown in FIG. 3, this embodiment provides a method for connecting to a called terminal. This embodiment is specifically applied in a mAGCF POOL networking disaster recovery processing situation and in a scenario where a terminal is located at an IMS domain and is used as a called terminal. This embodiment is a specification of the previous first embodiment, which may include the following steps.

Step 301: A primary mAGCF backs up MSISDN information, IMSI information and LAI information that correspond to a called terminal to a secondary mAGCF.

Figure 4:
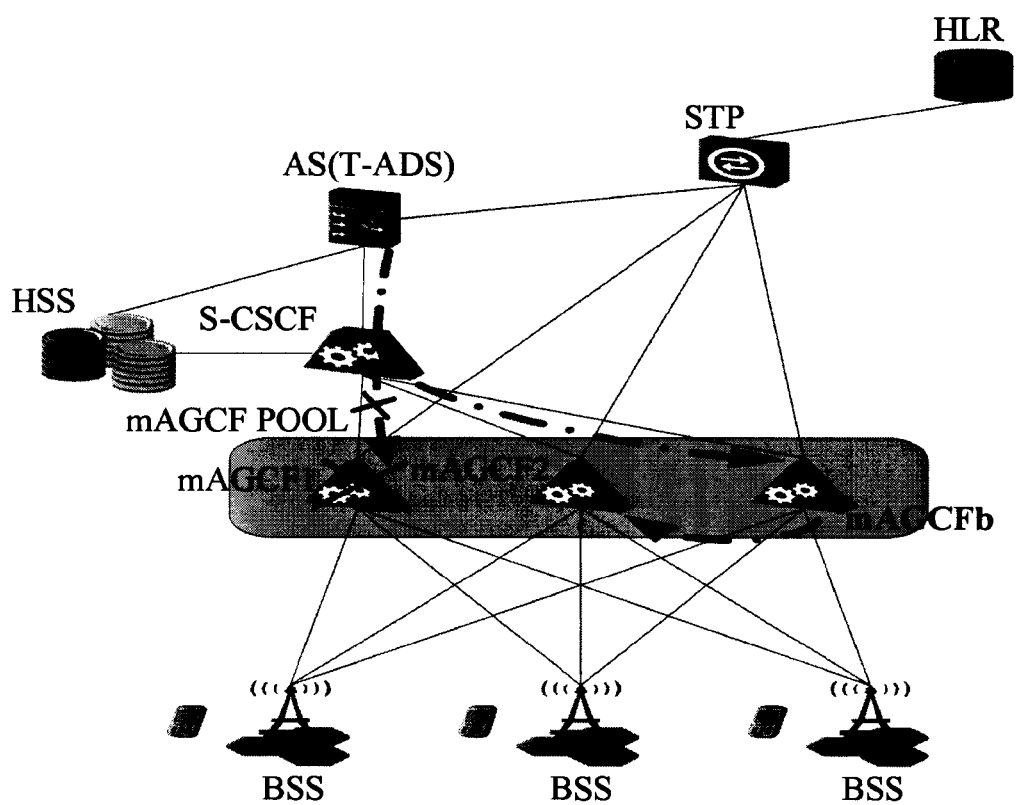
FIG. 4 is a schematic diagram of a mAGCF POOL networking architecture of a second embodiment of a method for connecting to a called terminal according to the present invention.

FIG. 4 is a schematic diagram of a mAGCF POOL networking architecture of a second embodiment of a method for connecting to a called terminal of the present invention. As shown in FIG. 4, a mAGCF 1 is a primary mAGCF corresponding to the called terminal; a mAGCF b is a secondary mAGCF corresponding to the called terminal; and a mAGCF 2 is another mAGCF in the mAGCF POOL. Apart from the primary mAGCF and the secondary mAGCF, here merely one of other mAGCFs is shown. More other mAGCFs may exist, such as mAGCF 3 and mAGCF 4, which are not shown in detail in FIG. 4. In this embodiment, the primary mAGCF corresponding to the called terminal acquires information of the called terminal and backs up the information in real time to the secondary mAGCF corresponding to the called terminal. Apart from the IMSI information, the LAI information and a subscriber state, for the information of the terminal, the secondary mAGCF in this embodiment further backs up the MSISDN information of the terminal, so as to be directly used in subsequent steps. Generally, when a terminal completes operations such as registration and location updating, MSISDN information, IMSI information and LAI information that correspond to the terminal may be changed, and in this case, updated information is backed up again, so as to ensure that the information of the terminal that is stored in the secondary mAGCF is the latest information.

Step 302: When the primary mAGCF has a failure, an S-CSCF connects the called of the called terminal which is located at the IMS domain to the secondary mAGCF.

In this embodiment, an AS may be used as a called domain selection function (TADS) entity. The terminal information stored in the primary mAGCF and the secondary mAGCF that correspond to the called terminal further includes MSISDN information corresponding to the terminal apart from the IMSI information and the LAI information. Therefore, when the primary mAGCF corresponding to the called terminal is in a normal working state, the AS may directly use the MSISDN information to connect the called of the terminal to the primary mAGCF. Then the primary mAGCF delivers a specified paging according to the stored LAI information, and performs procedures such as the location updating and registration of the terminal. In this embodiment, when the S-CSCF detects that the primary mAGCF has a failure and finds that a SIP message received from the AS is a message sent to the primary mAGCF that has the failure, in order to implement a normal called on the called terminal, the S-CSCF acquires a secondary mAGCF corresponding to the called terminal through a domain name system (Domain Name System; hereinafter referred to as DNS) primary and secondary routing mechanism, and then connects the call to the secondary mAGCF.

Step 303: The secondary mAGCF extracts, from the backup data, MSISDN information corresponding to the called terminal, together with IMSI information and LAI information that correspond to the MSISDN information.

Since the secondary mAGCF is backed up with related backup data of the called terminal, the secondary mAGCF extracts, from the backup data, the MSISDN information corresponding to the called terminal, together with the IMSI information and the LAI information corresponding to the MSISDN information.

Step 304: The secondary mAGCF sends a session initiation protocol SIP message to a selected mAGCF, where the SIP message carries the MSISDN information, the IMSI information and the LAI information.

After the secondary mAGCF extracts the MSISDN information, the IMSI information and the LAI information, the secondary mAGCF may select, according to a preset rule, a mAGCF from the mAGCF POOL as the selected mAGCF, that is, one of other mAGCFs apart from the primary mAGCF and the secondary mAGCF is selected according to a preset rule. As shown in FIG. 4, the mAGCF 2 may be selected as the selected mAGCF. Specifically, in this embodiment, one of other mAGCFs may be selected from the mAGCF POOL according to a runoff selection rule or a minimum load selection rule; and a mAGCF that has a small network load currently may be selected, which is not described in detail here. After selecting the selected mAGCF, the secondary mAGCF sends the extracted MSISDN information, IMSI information and LAI information that correspond to the called terminal to the selected mAGCF; and then sends a SIP message, which specifically may be an invite message in the SIP, to the selected mAGCF, where the invite message carries the MSISDN information, the IMSI information and the LAI information.

Further, in this embodiment, the IMSI information is carried in an expended session initiation protocol uniform resource identifier (SIP Uniform Resource Identifier; hereinafter referred to as SIP URI)/session initiation protocol security uniform resource identifier (SIP Security Uniform Resource Identifier; hereinafter referred to as SIPS-URI) and telephone number uniform resource identifier (Telephone number Uniform Resource Identifier; hereinafter referred to as TEL URI) of the SIP message; and the LAI information is carried in a header field of newly-added called access network information (P-Called-Access-Network-Info) of the SIP message. In this embodiment, the IMSI information and the LAI information is carried through the header field of the Invite message in the SIP. The IMSI information may be carried in a number format of the SIP message. Specifically, the SIP URI/SIPS-URI and the TEL URI in the SIP message are expanded to implement carrying the IMSI information in the SIP message; and a P-Called-Access-Network-Info header field is newly added in the SIP message to implement carrying the LAI information in the SIP message.

Step 305: The selected mAGCF performs a connecting to the called terminal according to the MSISDN information, the IMSI information and the LAI information.

After receiving the MSISDN information, the IMSI information and the LAI information that are forwarded by the secondary mAGCF, the selected mAGCF acquires through the IMSI information and the LAI information that the called terminal is not located at a VLR of itself, and then delivers a paging of the specified LAI information according to the MSISDN information, the IMSI information and the LAI information to perform processing of location updating and registration, thereby implementing the connecting to the called terminal on the selected mAGCF and completing one restoration of the called terminal.

This embodiment provides a method for connecting to a called terminal. In an application scenario where a terminal is located at an IMS domain as a called terminal, when a primary mAGCF of a called terminal has a failure, a call may be connected to a secondary mAGCF. The secondary mAGCF extracts, through backup data, MSISDN information, IMSI information and LAI information that correspond to the called terminal; carries the MSISDN information, the IMSI information and the LAI information in a SIP message to be sent to a selected mAGCF in a mAGCF POOL; and performs a connecting to the called terminal through the selected mAGCF, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved, so as to implement that during a mAGCF POOL disaster recovery procedure, an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

Figure 5:
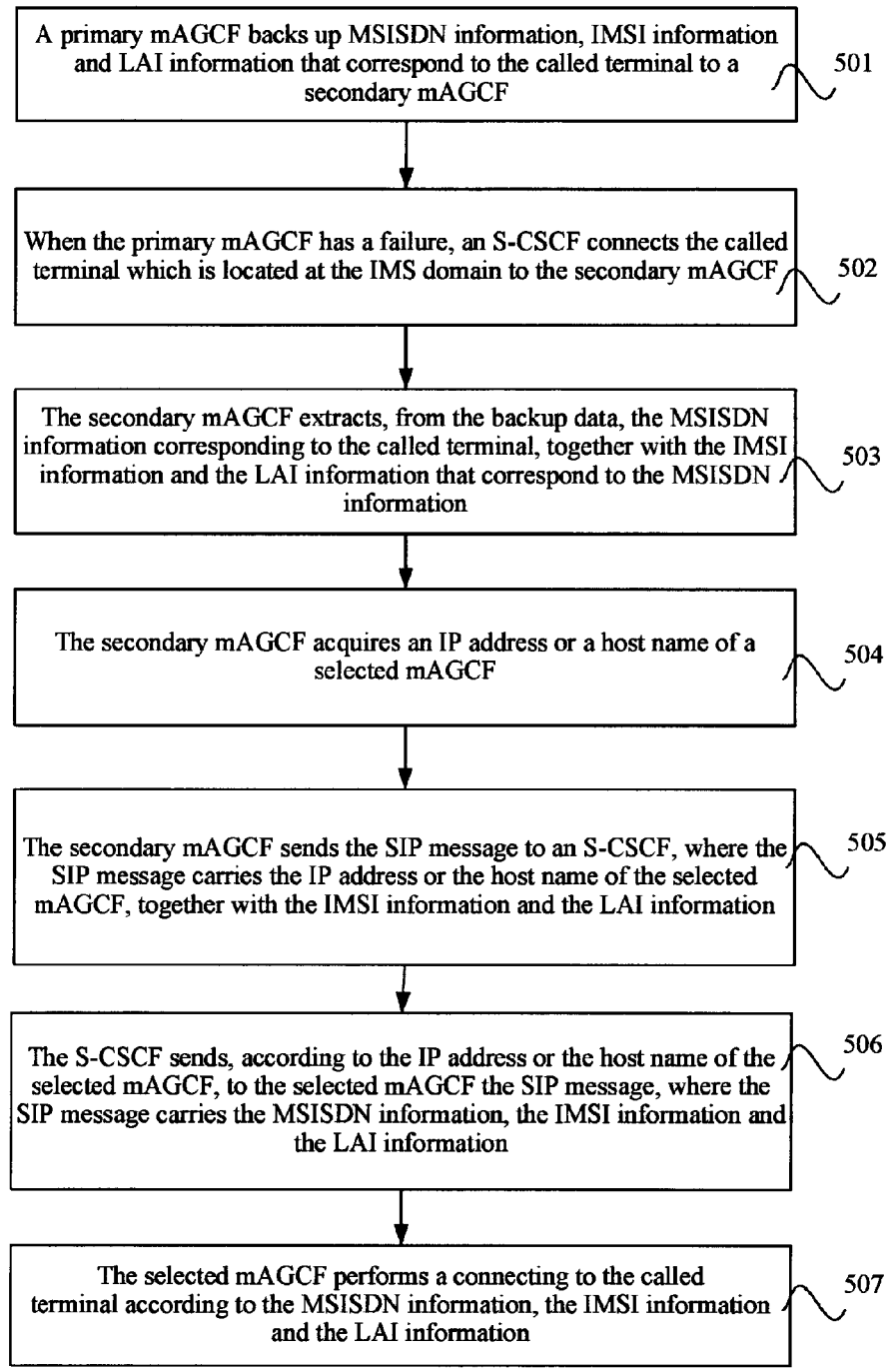
FIG. 5 is a flow chart of a third embodiment of a method for connecting to a called terminal according to the present invention.

FIG. 5 is a flow chart of a third embodiment of a method for connecting to a called terminal of the present invention. As shown in FIG. 5, this embodiment is specifically applied in a mAGCF POOL networking disaster recovery processing situation, and in a scenario where a terminal is located at an IMS domain as a called terminal. This embodiment is a specification of the previous first embodiment, which may include the following steps.

Step 501: A primary mAGCF backs up MSISDN information, IMSI information and LAI information that correspond to the called terminal to a secondary mAGCF. This step is similar to the previous step 301, which is not described in detail here.

Step 502: When the primary mAGCF has a failure, an S-CSCF connects the called of the called terminal which is located at the IMS domain to the secondary mAGCF. This step is similar to the previous step 302, which is not described in detail here.

Step 503: The secondary mAGCF extracts, from the backup data, the MSISDN information corresponding to the called terminal, together with the IMSI information and the LAI information corresponding to the MSISDN information. This step is similar to the previous step 303, which is not described in detail here.

Step 504: The secondary mAGCF acquires an IP address or a host name of a selected mAGCF.

Figure 6:
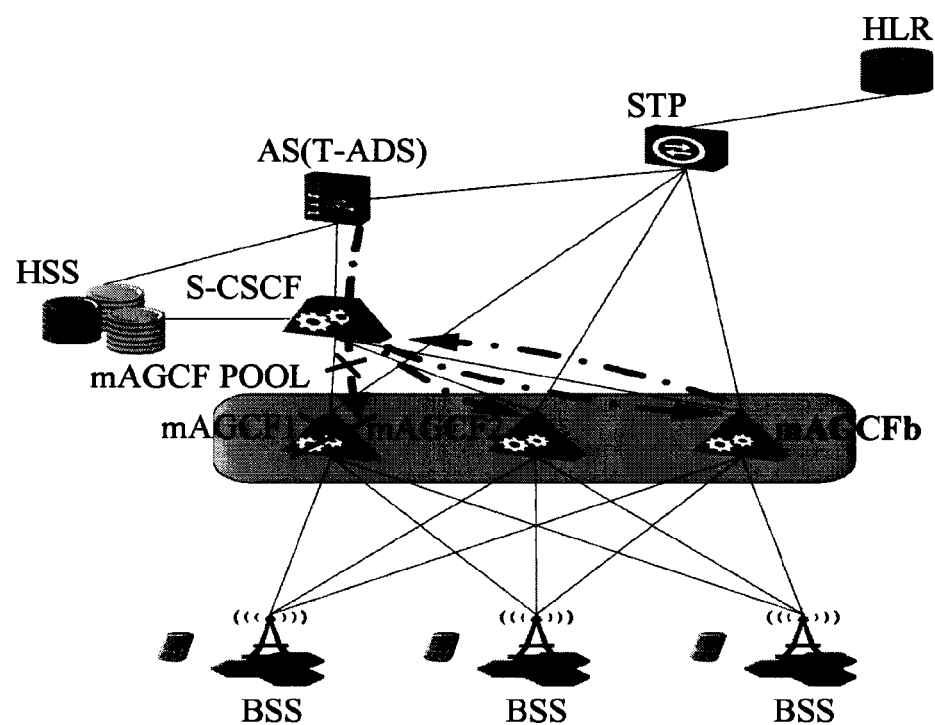
FIG. 6 is a schematic diagram of a mAGCF POOL networking architecture of a third embodiment of a method for connecting to a called terminal according to the present invention.

After the secondary mAGCF extracts the MSISDN information, the IMSI information and the LAI information, the secondary mAGCF may select, according to a preset rule, a mAGCF from the mAGCF POOL as the selected mAGCF, that is, one of other mAGCFs apart from the primary mAGCF and the secondary mAGCF is selected according to a preset rule. FIG. 6 is a schematic diagram of a mAGCF POOL networking architecture of a third embodiment of a method for connecting to a called terminal of the present invention. As shown in FIG. 6, the mAGCF 2 may be selected as the selected mAGCF. Specifically, in this embodiment, one of other mAGCFs may be selected from the mAGCF POOL according to a runoff selection rule or a minimum load selection rule; and a mAGCF having a small network load currently may be selected, which is not described in detail here. After selecting to obtain the selected mAGCF, the secondary mAGCF acquires the IP address or the host name of the selected mAGCF, and carries the acquired IP address or host name of the selected mAGCF, together with the IMSI information and the LAI information in a SIP message.

Step 505: The secondary mAGCF sends the SIP message to an S-CSCF, where the SIP message carries the IP address or the host name of the selected mAGCF, together with the IMSI information and the LAI information.

The secondary mAGCF sends the SIP message to the S-CSCF, and may put the IP address or the host name of the selected mAGCF, together with the IMSI information and the LAI information in a reselection routing message 302 of the SIP message to be returned to the S-CSCF.

Step 506: The S-CSCF sends, according to the IP address or the host name of the selected mAGCF, the SIP message to the selected mAGCF, where the SIP message carries the MSISDN information, the IMSI information and the LAI information.

After receiving the reselection routing message 302 of the SIP message, the S-CSCF acquires the IP address or the host name of the selected mAGCF, together with the MSISDN information, the IMSI information and the LAI information.

The S-CSCF initiates the reselection routing according to the IP address or the host name of the selected mAGCF. The S-CSCF sends, according to the IP address or the host name, the SIP message to the selected mAGCF, where the SIP message carries the MSISDN information, the IMSI information and the LAI information, that is, through the Invited message, the call is connected to a selected mAGCF that is specified by the reselection routing message 302 of the SIP message.

Step 507: The selected mAGCF performs a connecting to the called terminal according to the MSISDN information, the IMSI information and the LAI information. This step is similar to the previous step 305, which is not described in detail here.

This embodiment provides a method for connecting to a called terminal. In an application scenario where a terminal is located at an IMS domain as a called terminal, when a primary mAGCF of a called terminal has a failure, a call may be connected to a secondary mAGCF. The secondary mAGCF extracts, through backup data, MSISDN information, IMSI information and LAI information that correspond to the called terminal; acquires an IP address or a host name of the selected mAGCF; and carries the MSISDN information, the IMSI information and the LAI information in a SIP message to be sent to the S-CSCF. The S-CSCF sends the SIP message to the selected mAGCF according to the IP address or the host name of the selected mAGCF. The selected mAGCF performs a connecting to the called terminal, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved, so as to implement that during a mAGCF POOL disaster recovery procedure, an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

Figure 7:
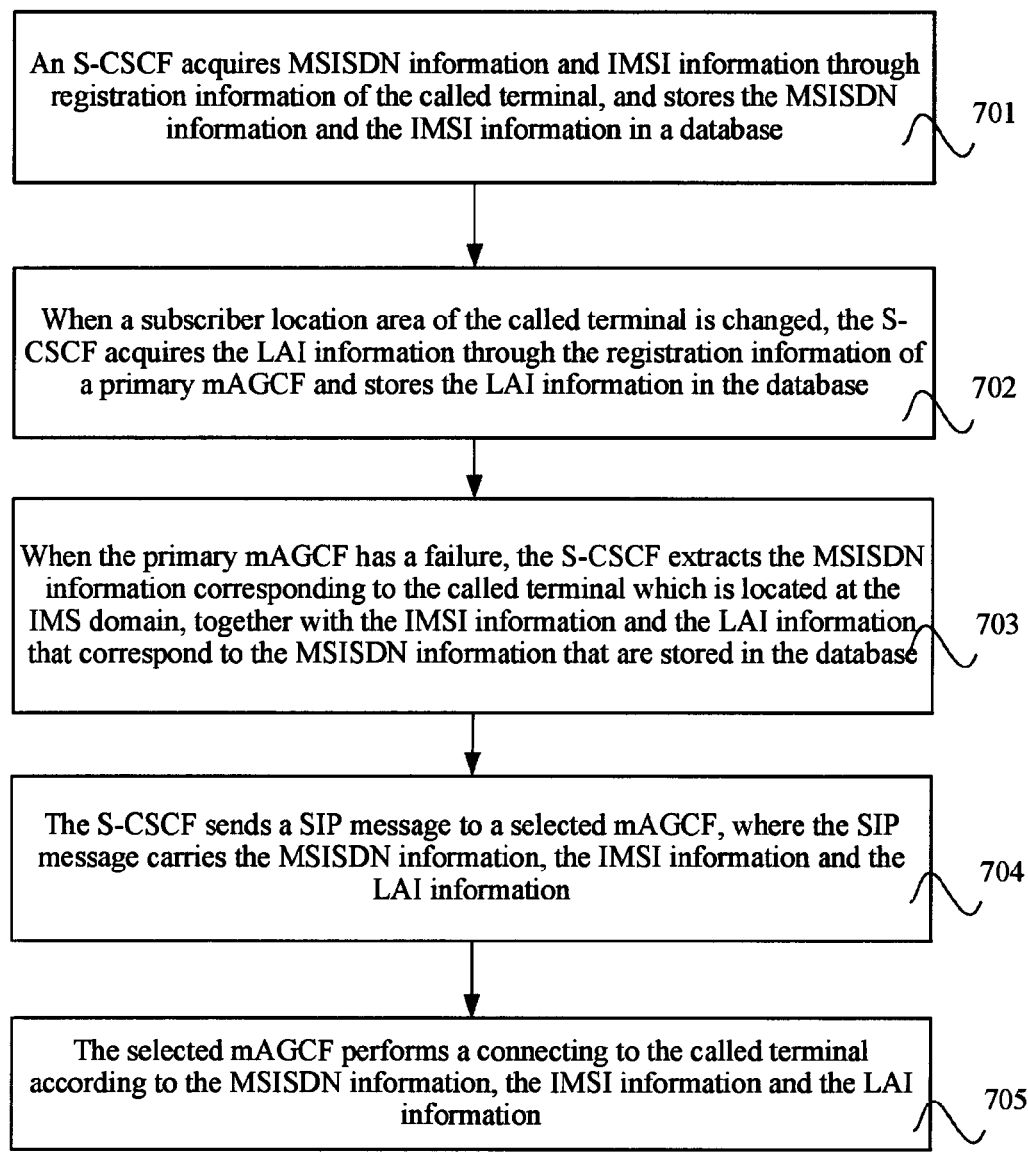
FIG. 7 is a flow chart of a fourth embodiment of a method for connecting to a called terminal according to the present invention.

FIG. 7 is a flow chart of a fourth embodiment of a method for connecting to a called terminal of the present invention. As shown in FIG. 7, this embodiment provides a method for connecting to a called terminal. This embodiment is specifically applied in a mAGCF POOL networking disaster recovery processing situation and in a scenario where a terminal is located at an IMS domain as a called terminal. This embodiment is a specification of the previous first embodiment, which may include the following steps.

Step 701: An S-CSCF acquires MSISDN information and IMSI information through registration information of the called terminal, and stores the MSISDN information and the IMSI information in a database.

Figure 8:
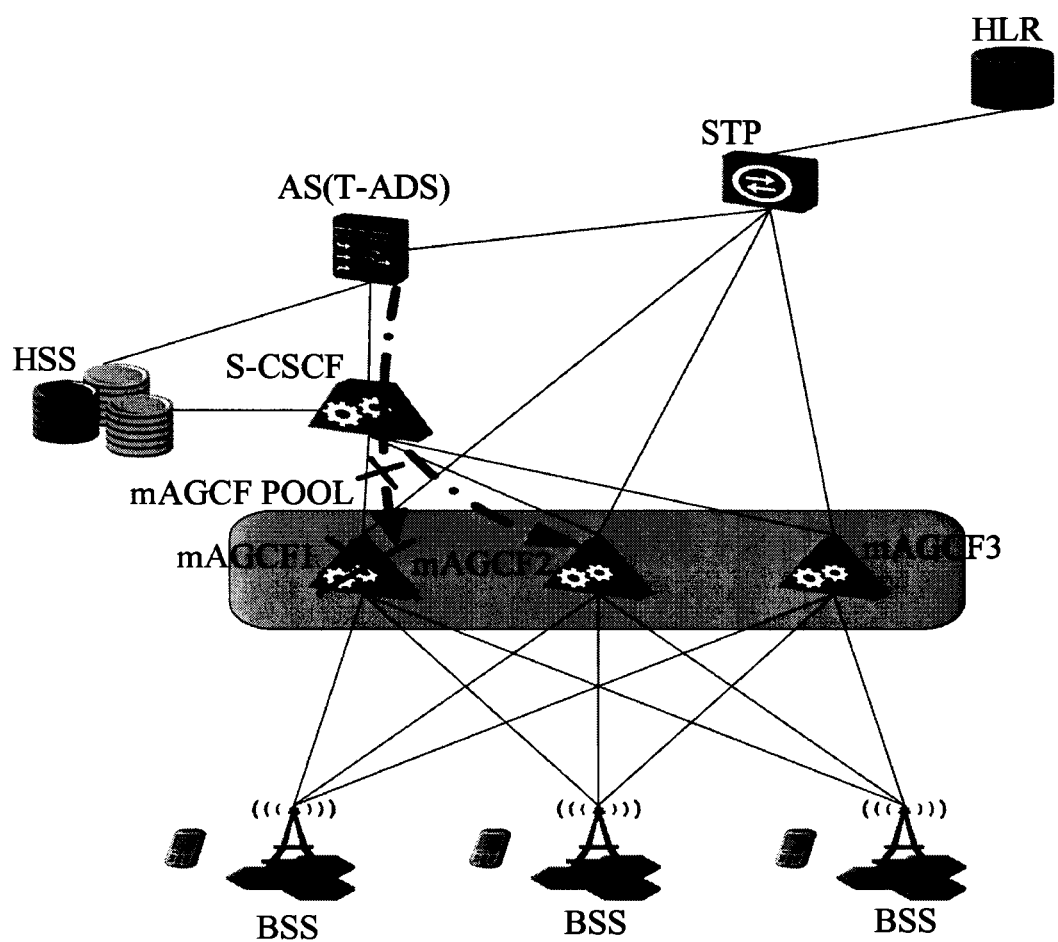
FIG. 8 is a schematic diagram of a mAGCF POOL networking architecture of a fourth embodiment of a method for connecting to a called terminal according to the present invention.

FIG. 8 is a schematic diagram of a mAGCF POOL networking architecture of a fourth embodiment of a method for connecting to a called terminal of the present invention. In this embodiment, the S-CSCF replaces the secondary mAGCF corresponding to the called terminal to back up related information of the called terminal. Specifically, since each subscriber terminal is required to register on the S-CSCF while getting access to an IMS or CS network, and when the called terminal registers, the S-CSCF may acquire information of the called terminal through registration information of the called terminal. In this embodiment, while registering on the S-CSCF, the called terminal carries in the registration information not only subscriber state information of itself, but also MSISDN information and IMSI information corresponding to itself. The S-CSCF may acquire the MSISDN information and the IMSI information that correspond to the called terminal through the registration information, and store the MSISDN information and the IMSI information in the database. The database where the MSISDN information and the IMSI information are stored may be the local S-CSCF or an HSS.

Step 702: When a subscriber location area of the called terminal is changed, the S-CSCF acquires the LAI information through the registration information of a primary mAGCF, and stores the LAI information in the database.

In this embodiment, when a location area of a subscriber terminal is changed, apart from that the terminal reports a location updating request to a visit location register (Visit Location Register; hereinafter referred to as VLR) and updates LAI information that is stored in the VLR, a primary mAGCF of the terminal initiates, after finding that the location of the terminal is changed, a registration to the S-CSCF, where the registration information carries updated LAI information of the terminal. In this embodiment, the S-CSCF acquires the updated LAI information corresponding to the called terminal through the registration information of the primary mAGCF corresponding to the called terminal, and then updates the LAI information that is stored in the database.

Step 703: When the primary mAGCF has a failure, the S-CSCF extracts the MSISDN information corresponding to the called terminal which is located at the IMS domain, together with the IMSI information and the LAI information that correspond to the MSISDN information that is stored in the database.

In this embodiment, the S-CSCF is used as a secondary mAGCF of the called terminal. While performing a call connection, after finding that the primary mAGCF has a failure, the S-CSCF extracts, from the backup data stored in the database, the MSISDN information corresponding to the called terminal, together with the IMSI information and the LAI information that correspond to the MSISDN information.

Step 704: The S-CSCF sends a session initiation protocol SIP message to a selected mAGCF, where the SIP message carries the MSISDN information, the IMSI information and the LAI information.

After extracting the MSISDN information, the IMSI information and the LAI information, the S-CSCF may select, according to a preset rule, a mAGCF from the mAGCF POOL as the selected mAGCF, specifically similar to the previous step 304, which is not described in detail here. After selecting to obtain the selected mAGCF, the S-CSCF sends an invite message in the SIP to the selected mAGCF. The invite message carries the MSISDN information, the IMSI information and the LAI information.

Step 705: The selected mAGCF performs a connecting to the called terminal according to the MSISDN information, the IMSI information and the LAI information.

After receiving the MSISDN information, the IMSI information and the LAI information that are forwarded by the S-CSCF, the selected mAGCF acquires through the IMSI information and the LAI information that the called terminal is not located at a VLR of itself, and then delivers a paging of the specified LAI information according to the MSISDN information, the IMSI information and the LAI information, to perform processing of location updating and registration; and then registers the called terminal on the S-CSCF again, thereby implementing the connecting to the called terminal on the selected mAGCF and completing one restoration of the called terminal.

This embodiment provides a method for connecting to a called terminal. In an application scenario where a terminal is located at an IMS domain as a called terminal, when a primary mAGCF of a called terminal has a failure, an S-CSCF replaces a secondary mAGCF. The S-CSCF carries the extracted MSISDN information, IMSI information and LAI information that correspond to the called terminal in a SIP message to be sent to a selected mAGCF of a mAGCF POOL; and performs a connecting to the called terminal through the selected mAGCF, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved in this embodiment, so as to implement that during a mAGCF POOL disaster recovery procedure, an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

Figure 9:
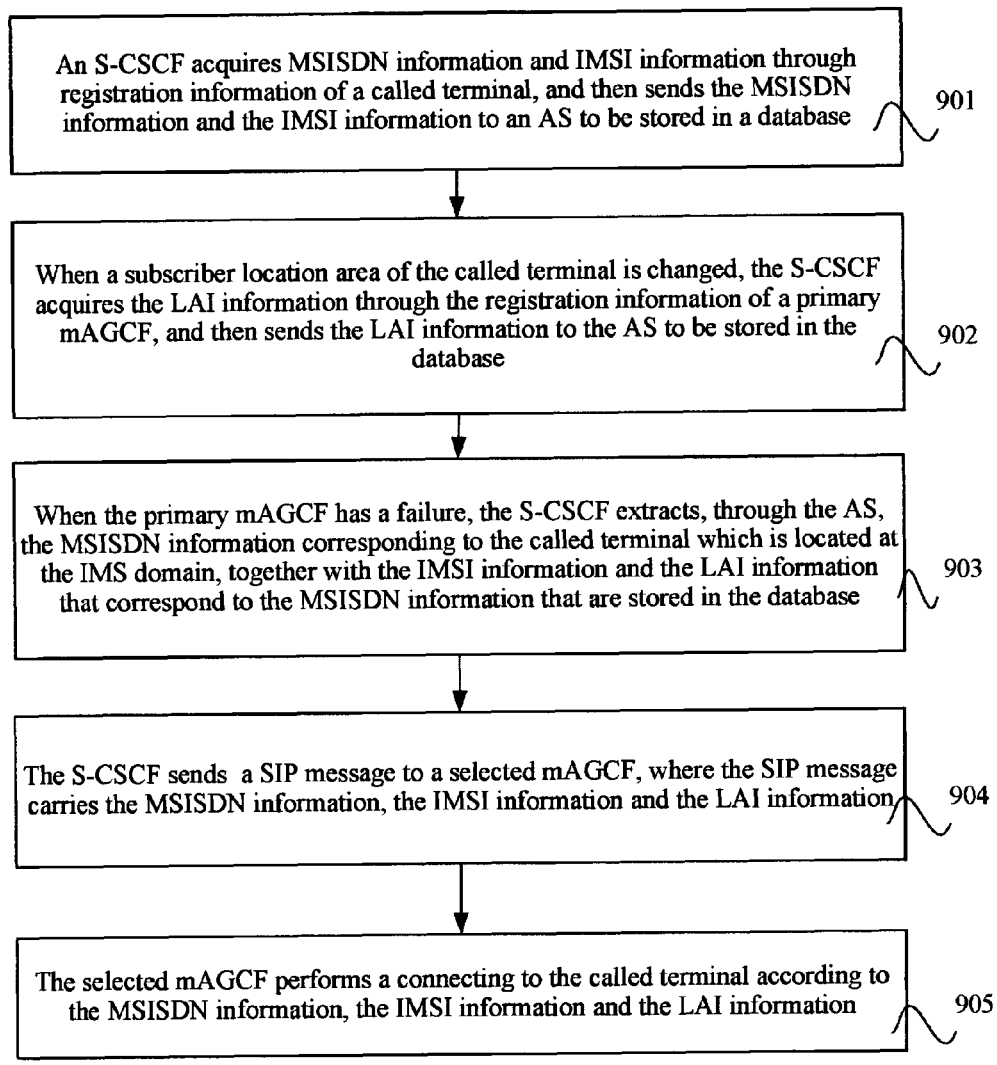
FIG. 9 is a flow chart of Embodiment 5 of a method for connecting to a called terminal according to the present invention.

FIG. 9 is a flow chart of a fifth of a method for connecting to a called terminal according to another embodiment of the present invention. As shown in FIG. 9, this embodiment provides a method for connecting to a called terminal. The process of this embodiment is similar to that of the previous fourth embodiment, and the difference lies in that, information of a called terminal is stored in a database, and the database in this embodiment may be an AS or an HSS. Specifically, this embodiment may include the following steps.

Step 901: An S-CSCF acquires MSISDN information and IMSI information through registration information of a called terminal, and then sends the MSISDN information and the IMSI information to an AS to be stored in a database. This step is similar to the previous step 701, which is not described in detail here.

Step 902: When a subscriber location area of the called terminal is changed, the S-CSCF acquires the LAI information through the registration information of a primary mAGCF, and then sends the LAI information to the AS to be stored in the database. This step is similar to the previous step 702, which is not described in detail here.

This embodiment stores MSISDN information, IMSI information and LAI information of the called terminal through an AS, which greatly reduce the load of an S-CSCF, and improve the working efficiency of the S-CSCF.

Step 903: When the primary mAGCF has a failure, the S-CSCF extracts, through the AS, the MSISDN information corresponding to the called terminal which is located at the IMS domain, together with the IMSI information and the LAI information that correspond to the MSISDN information that are stored in the database. This step is similar to the previous step 703, which is not described in detail here.

Step 904: The S-CSCF sends a session initiation protocol SIP message to a selected mAGCF, where the SIP message carries the MSISDN information, the IMSI information and the LAI information. This step is similar to the previous step 704, which is not described in detail here.

Step 905: The selected mAGCF performs a connecting to the called terminal according to the MSISDN information, the IMSI information and the LAI information. This step is similar to the previous step 705, which is not described in detail here.

Persons of ordinary skill in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as an ROM, an RAM, a magnetic disk, or an optical disk.

Figure 10:
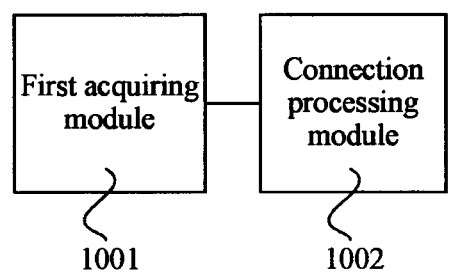
FIG. 10 is a schematic structure diagram of a first embodiment of an apparatus for connecting to a called terminal according to the present invention.

FIG. 10 is a schematic structure diagram of a first embodiment of an apparatus for connecting to a called terminal of the present invention. As shown in FIG. 10, this embodiment provides an apparatus for connecting to a called terminal, which may specifically implement each step in the first embodiment of the foregoing method, which is not described in detail here. The apparatus for connecting to a called terminal provided in this embodiment may specifically be a secondary mAGCF or an S-CSCF. Specifically, the apparatus for connecting to a called terminal provided in this embodiment includes a first acquiring module 1001 and a connection processing module 1002. The first acquiring module 1001 is configured to, when a primary mAGCF has a failure, acquire MSISDN information corresponding to a called terminal which is located at an IMS domain, together with IMSI information and LAI information that correspond to the MSISDN information. The connection processing module 1002 is configured to send a selected mAGCF the MSISDN information, the IMSI information and the LAI information, where the selected mAGCF performs a connecting to the called terminal.

Still as shown in FIG. 10, this embodiment provides a specific second embodiment of the apparatus for connecting to a called terminal. The apparatus for connecting to a called terminal of this embodiment may specifically be a secondary mAGCF. In this embodiment, each step of the previous second method embodiment may specifically be implemented, which is not described in detail here. This embodiment is based on the first embodiment which is shown in FIG. 10. The first acquiring module 1001 in this embodiment may be specifically configured to, when a primary mAGCF has a failure, acquire MSISDN information corresponding to a called terminal which is located at an IMS domain, together with IMSI information and LAI information that correspond to the MSISDN information from backup data of a backup mAGCF.

This embodiment provides an apparatus for connecting to a called terminal. In an application scenario where a terminal is located at an IMS domain as a called terminal, when a primary mAGCF of the called terminal has a failure, a call may be connected to a secondary mAGCF. The secondary mAGCF extracts, through backup data, MSISDN information, IMSI information and LAI information that correspond to the called terminal; carries the MSISDN information, the IMSI information and the LAI information in a SIP message to be sent to a selected mAGCF in a mAGCF POOL; performs a connecting to the called terminal through the selected mAGCF, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved, so as to implement that during a mAGCF POOL disaster recovery procedure, an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

Figure 11:
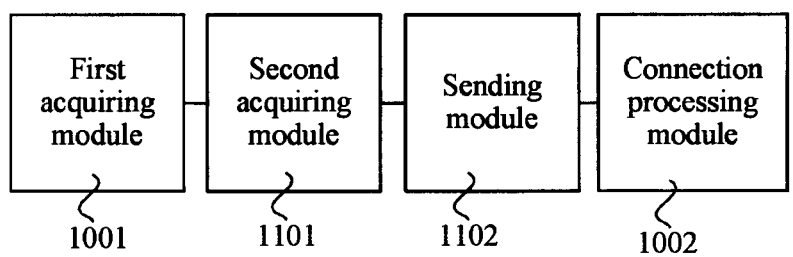
FIG. 11 is a schematic structure diagram of a third embodiment of an apparatus for connecting to a called terminal according to the present invention.

FIG. 11 is a schematic structure diagram of a third embodiment of an apparatus for connecting to a called terminal of the present invention. As shown in FIG. 11, an apparatus for connecting to a called terminal provided in this embodiment may specifically be a secondary mAGCF. In this embodiment, each step in the previous third method embodiment may specifically be implemented, which is not described in detail here. This embodiment, based on the first embodiment which is shown in FIG. 10, may further include a second acquiring module 1101 and a sending module 1102. The second acquiring module 1101 is configured to acquire an IP address or a host name of the selected mAGCF before a selected mAGCF performs a connecting to the called terminal. The sending module 1102 is configured to send the SIP message to a serve-call session control function entity S-CSCF, where the SIP message carries the IP address or the host name of the selected mAGCF, together with the IMSI information and the LAI information. The connection processing module 1002 in this embodiment may be specifically configured to send the SIP message to the selected mAGCF through the S-CSCF according to the IP address or the host name of the selected mAGCF, where the SIP message carries the MSISDN information, the IMSI information and the LAI information; and the selected mAGCF performs the connecting to the called terminal.

This embodiment provides an apparatus for connecting to a called terminal. In an application scenario where a terminal is located at an IMS domain as a called terminal, when a primary mAGCF of the called terminal has a failure, a call may be connected to a secondary mAGCF. The secondary mAGCF extracts, through backup data, MSISDN information, IMSI information and LAI information that correspond to the called terminal; and performs a connecting to the called terminal through a selected mAGCF in a mAGCF POOL according to the MSISDN information, the IMSI information and the LAI information, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved, so as to implement that during a mAGCF POOL disaster recovery procedure, an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

Still as shown in FIG. 10, this embodiment provides a specific fourth embodiment of the apparatus for connecting to a called terminal. The apparatus for connecting to a called terminal of this embodiment may specifically be an S-CSCF. In this embodiment, each step of the previous fourth method embodiment may specifically be implemented, which is not described in detail here. Specifically, the apparatus for connecting to a called terminal provided in this embodiment is based on the first embodiment which is shown in FIG. 10, and the selected mAGCF is selected by the S-CSCF from a mAGCF POOL according to a preset rule. The first acquiring module 1001 of this embodiment is specifically configured to, when a primary mAGCF has a failure, acquire MSISDN information corresponding to a called terminal which is located at an IMS domain, together with IMSI information and LAI information that correspond to the MSISDN information that are stored in the S-CSCF.

This embodiment provides an apparatus for connecting to a called terminal. In an application scenario where a terminal is located at an IMS domain as a called terminal, when a primary mAGCF of a called terminal has a failure, an S-CSCF replaces a secondary mAGCF. The S-CSCF may carry the extracted MSISDN information, IMSI information and LAI information that correspond to the called terminal in a SIP message to be sent to a selected mAGCF of a mAGCF POOL, and perform a connecting to the called terminal through the selected mAGCF, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that during a mAGCF POOL disaster recovery procedure, the performance of a network element is lowered are solved in this embodiment, so as to implement that an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

Still as shown in FIG. 10, this embodiment provides a specific embodiment of the apparatus for connecting to a called terminal. The apparatus for connecting to a called terminal of this embodiment may specifically be an S-CSCF. In this embodiment, each step of the previous fifth method embodiment may be specifically implemented, which is not described in detail here. This embodiment is based on the first embodiment that is shown in FIG. 10. The first acquiring module 1001 in this embodiment may be specifically configured to, when a primary mAGCF has a failure, acquire, through an application server, MSISDN information corresponding to a called terminal which is located at an IMS domain, together with IMSI information and LAI information that correspond to the MSISDN information that are stored in the application server.

This embodiment provides an apparatus for connecting to a called terminal. In an application scenario where a terminal is located at an IMS domain as a called terminal, when a primary mAGCF of a called terminal has a failure, an S-CSCF replaces a secondary mAGCF. The S-CSCF may perform a connecting to the called terminal through a selected mAGCF in a mAGCF POOL according to extracted MSISDN information, IMSI information and LAI information that correspond to the called terminal, so that a restoration of the called terminal of a disaster recovery in the mAGCF POOL is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved in this embodiment, so as to implement that during a mAGCF POOL disaster recovery procedure, an MSISDN is directly used to perform a connecting to the called terminal when the called terminal is located at an IMS domain, where the AS is not required to acquire the MSRN from the CS domain, and neither is the mAGCF required to provide an MSRN for a subscriber in the IMS domain; and therefore, the performance of the AS and the mAGCF is improved. In addition, since the S-CSCF is merely required to route a strange MSRN to the CS domain, merely one path of routing data is required to support the MSRN, and thereby the waste of routing resources is reduced.

An embodiment of the present invention further provides a system for connecting to a called terminal, which is applied in a mobile access gateway control function entity POOL mAGCF POOL, and includes the apparatus for connecting to a called terminal in the previous embodiment. The apparatus for connecting to a called terminal is specifically configured to:

when a primary mAGCF has a failure, acquire MSISDN information corresponding to a called terminal which is located at an IMS domain, together with IMSI information and LAI information that correspond to the MSISDN information; and send a selected mAGCF the MSISDN information, the IMSI information and the LAI information, where the selected mAGCF performs a connecting to the called terminal.

The system for connecting to a called terminal provided in this embodiment is applied in an application scenario where a terminal is located at an IMS domain as a called terminal, and when a primary mAGCF of a called terminal has a failure, MSISDN information, IMSI information and LAI information that correspond to the called terminal are acquired, and a connecting to the called terminal is performed through a selected mAGCF in a mAGCF POOL, so that a restoration of the called terminal of a mAGCF POOL disaster recovery is implemented, and the shortages of a mAGCF POOL disaster recovery processing procedure in the prior art that whether a called terminal is located at a CS domain or at an IMS domain, an AS may unconditionally acquire an MSRN from the CS domain so that the performance of a network element is lowered are solved, so as to implement that during a mAGCF POOL disaster recovery procedure, an MSISDN is directly used to perform a connecting to the called terminal when the called terminal is located at an IMS domain, where a subscriber in the IMS domain is not required to be provided with an MSRN; and therefore, the performance of the AS and the mAGCF is improved; and the waste of routing resources is reduced.

Finally, it should be noted that the above embodiments are merely provided for describing the technical solutions of the present invention, but are not intended to limit the present invention. It should be understood by persons of ordinary skill in the art that although the present invention has been described in detail with reference to the embodiments, modifications may still be made to the technical solutions described in the embodiments, or equivalent replacements may be made to some technical features in the technical solutions, and these modifications or replacements do not cause the corresponding technical solutions to depart from the spirit and scope of the technical solutions of the present invention.

What is claimed is:

1. A method for connecting to a called terminal, comprising:
   acquiring, when a primary mobile access gateway control function (mAGCF) entity has a failure, mobile station international integrated service digital network number (MSISDN) information corresponding to the called terminal which is located at an IP multimedia subsystem (IMS) domain, and international mobile subscriber identity (IMSI) information and location area identity (LAI) information that correspond to the MSISDN information;
   connecting to the called terminal through a selected mAGCF according to the MSISDN information, the IMSI information and the LAI information;
   wherein acquiring the MSISDN information corresponding to the called terminal which is located at the IMS domain, and IMSI information and the LAI information that correspond to the MSISDN information comprises:
      acquiring the MSISDN information corresponding to the called terminal which is located at the IMS domain, and the IMSI information and the LAI information that correspond to the MSISDN information from backup data in a backup mAGCF; and
   wherein before connecting to the called terminal through the selected mAGCF, the method further comprises:
      acquiring an IP address or a host name of the selected mAGCF,
      sending a session initiation protocol (SIP) message to a serve-call control function (S-CSCF) entity, wherein the SIP message carries the IP address or the host name of the selected mAGCF, together with the IMSI information and the LAI information, and
      sending the SIP message to the selected mAGCF through the S-CSCF according to the IP address or the host name of the selected mAGCF, wherein the SIP message carries the MSISDN information, the IMSI information and the LAI information.

2. The method according to claim 1, wherein the IMSI information is carried in an expended session initiation protocol uniform resource identifier (SIP URI)/session initiation protocol security uniform resource identifier (SIPS-URI) and a telephone number uniform resource identifier (TEL URI) of the SIP message, and the LAI information is carried in a header field of newly-added called access network information P-Called-Access-Network-Info of the SIP message.

3. An apparatus for connecting to a called terminal, comprising:
   a first acquiring module, configured to acquire, when a primary mobile access gateway control function (mAGCF) entity has a failure, mobile station international integrated service digital network number (MSISDN) information corresponding to the called terminal which is located at an IP multimedia subsystem (IMS) domain, and international mobile subscriber identity (IIVISI) information and location area identity (LAI) information that correspond to the MSISDN information;

a connection processing module, configured to send, to a selected mAGCF, the MSISDN information, the IMSI information and the LAI information, wherein the selected mAGCF performs a connecting to the called terminal;

wherein the first acquiring module is configured to acquire the MSISDN information corresponding to the called terminal which is located at the IMS domain, and the IMSI information and the LAI information that correspond to the MSISDN information from backup data in a backup mAGCF when the primary mAGCF has a failure;

wherein the apparatus for connecting to the called terminal further comprises:

a second acquiring module, configured to acquire, before the performing the connecting to the called terminal through the selected mAGCF, an IP address or a host name of the selected mAGCF, a sending module, configured to send a SIP message to a serve-call session control function (S-CSCF) entity, wherein the SIP message carries the IP address or the host name of the selected mAGCF, together with the IMSI information and the LAI information, and wherein the connection processing module is configured to send the SIP message to the selected mAGCF through the S-CSCF according to the IP address or the host name of the selected mAGCF; the SIP message carries the MSISDN information, the IMSI information and the LAI information; and the selected mAGCF performs the connecting to the called terminal.

4. A system for connecting to a called terminal, which is applied to a mobile access gateway control function entity POOL mAGCF POOL, and comprises an apparatus for connecting to the called terminal, wherein the apparatus for connecting to the called terminal is configured to:

acquire, when a primary mobile access gateway control function (mAGCF) entity has a failure, mobile station international integrated service digital network number (MSISDN) information corresponding to a called terminal which is located at an IP multimedia subsystem (IMS) domain, and international mobile subscriber identity (IMSI) information and location area identity (LAI) information that correspond to the MSISDN information;

send, to a selected mAGCF, the MSISDN information, the IMSI information and the LAI information, wherein the selected mAGCF performs a connecting to the called terminal; and wherein the apparatus for connecting to the called terminal is configured to:

acquire the MSISDN information corresponding to the called terminal which is located at the IMS domain, and the IMSI information and the LAI information that correspond to the MSISDN information that are stored in a serve-call session control function (S-CSCF) entity when the primary mAGCF has a failure, or acquire, through an application server, the MSISDN information corresponding to the called terminal which is located at the IMS domain, and the IMSI information and the LAI information that correspond to the MSISDN information that are stored in the application sever when the primary mAGCF has a failure.

5. A method for connecting to a called terminal, the method comprising:

acquiring, when a primary mobile access gateway control function (mAGCF) entity has a failure, mobile station international integrated service digital network number (MSISDN) information corresponding to the called terminal which is located at an IP multimedia subsystem (LMS) domain, and international mobile subscriber identity (IMSI) information and location area identity (LAI) information that correspond to the MSISDN information;

connecting to the called terminal through a selected mAGCF according to the MSISDN information, the IMSI information and the LAI information;

wherein before connecting to the called terminal through the selected mAGCF, the method further comprises: sending, a session initiation protocol (SIP) message to the selected mAGCF, wherein the SIP message carries the MSISDN information, the IMSI information and the LAI information;

wherein the selected mAGCF is selected from a mobile access gateway control function entity POOL mAGCF POOL by a serve-call session control function (S-CSCF) entity according to a preset rule;

wherein acquiring the MSISDN information corresponding to the called terminal which is located at the IMS domain, and the IMSI information and the LAI information that correspond to the MSISDN information comprises: acquiring the MSISDN information corresponding to the called terminal which is located at the IMS domain, and the IMSI information and the LAI information that correspond to the MSISDN information that are stored in the S-CSCF;

acquiring the MSISDN information and the IMSI information through registration information of the called terminal; and when a subscriber location area of the called terminal is changed, acquiring the LAI information through registration information of the primary mAGCF.

6. A method for connecting to a called terminal, the method comprising:

acquiring, when a primary mobile access gateway control function (mAGCF) entity has a failure, mobile station international integrated service digital network number (MSISDN) information corresponding to the called terminal which is located at an IP multimedia subsystem (IMS) domain, and international mobile subscriber identity (IMSI) information and location area identity (LAI) information that correspond to the MSISDN information;

connecting to the called terminal through a selected mAGCF according to the MSISDN information, the IMSI information and the LAI information;

wherein before the connecting to the called terminal through the selected mAGCF, the method further comprises: sending, a session initiation protocol (SIP) message to the selected mAGCF, wherein the SIP message carries the MSISDN information, the IMSI information and the LAI information;

wherein the selected mAGCF is selected from a mobile access gateway control function entity POOL mAGCF POOL by a serve-call session control function (S-CSCF) entity according to a preset rule; and wherein acquiring the MSISDN information corresponding to the called terminal which is located at the IMS domain, and the IMSI information and the LAI information that correspond to the MSISDN information comprises: acquiring the MSISDN information corresponding to the called terminal which is located at the IMS domain, and the IMSI information and the LAI information that correspond to the MSISDN information that are stored in an application server.

7. An apparatus for connecting to a called terminal, the apparatus comprising:
  a first acquiring module, configured to acquire, when a primary mobile access gateway control function (mAGCF) entity has a failure, mobile station international integrated service digital network number (MSISDN) information corresponding to the called terminal which is located at an IP multimedia subsystem (IMS) domain, and international mobile subscriber identity (IMSI) information and location area identity (LAI) information that correspond to the MSISDN information;
  a connection processing module, configured to send, to a selected mAGCF, the MSISDN information, the IMSI information and the LAI information, wherein the selected mAGCF performs a connecting to the called terminal; and
wherein the first acquiring module is configured to:
  acquire the MSISDN information corresponding to the called terminal which is located at the IMS domain, and the IMSI information and the LAI information that correspond to the MSISDN information that are stored in a serve-call session control function (S-CSCF) entity when the primary mAGCF has a failure, or
  acquire, through an application server, the MSISDN information corresponding to the called terminal which is located at the IMS domain, and the IMSI information and the LAI information that correspond to the MSISDN information that are stored in the application sever when the primary mAGCF has a failure.

* * * * *

UNITED STATES PATENT AND TRADEMARK OFFICE
CERTIFICATE OF CORRECTION

Page 1 of 1

PATENT NO. : 8,675,640 B2
APPLICATION NO. : 13/532018
DATED : March 18, 2014
INVENTOR(S) : Haiyang Liu, Xiaojin Li and Biao Zhang It is certified that error appears in the above-identified patent and that said Letters Patent is hereby corrected as shown below:

Claims

Column 16, Claim 3, Line 65, delete "(IIVISI)" and insert -- IMSI --

Signed and Sealed this
First Day of March, 2016

Michelle K. Lee
*Director of the United States Patent and Trademark Office*